Oct. 22, 1963 W. E. TRUMPLER 3,107,955
BEARING
Filed Feb. 13, 1961 3 Sheets-Sheet 1

INVENTOR.
William E. Trumpler
BY
Popp and Sommer
ATTORNEYS.

Oct. 22, 1963 W. E. TRUMPLER 3,107,955
BEARING
Filed Feb. 13, 1961 3 Sheets-Sheet 2
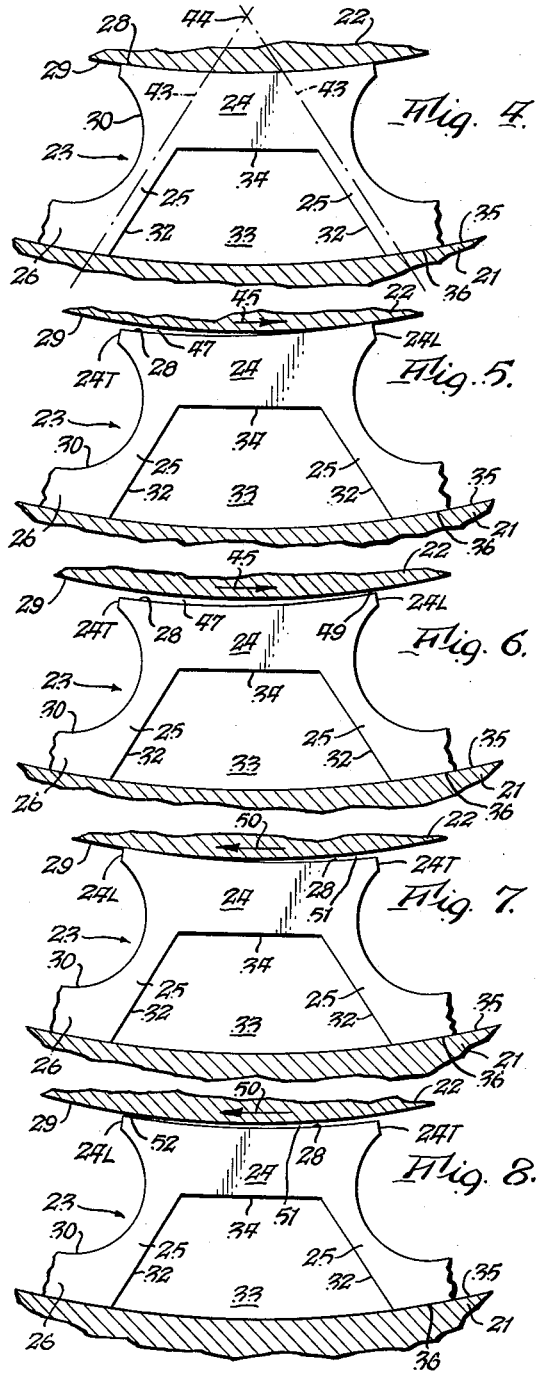
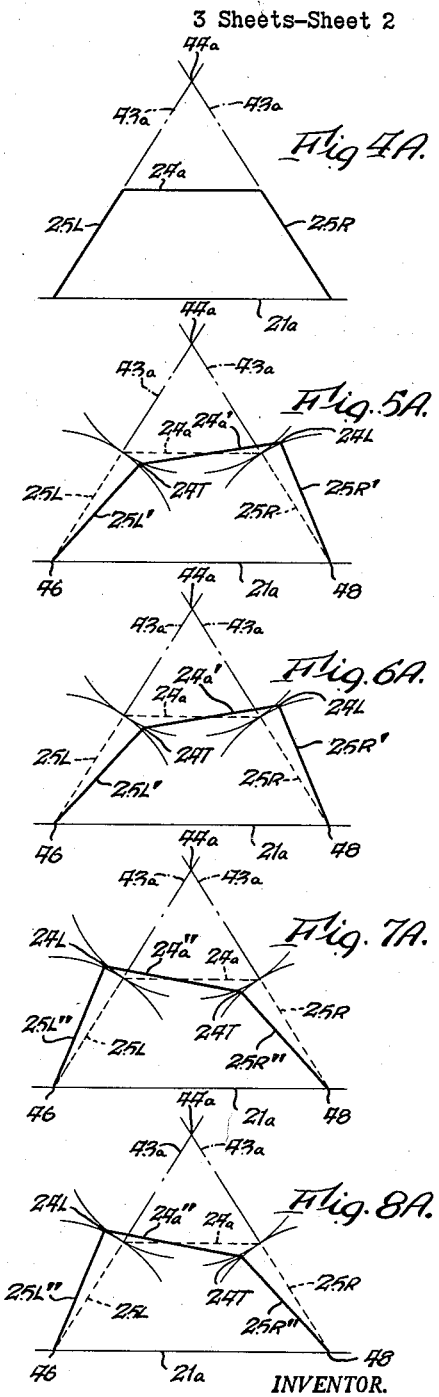
INVENTOR.
William E. Trumpler
BY
Popp and Sommer
ATTORNEYS.

INVENTOR.
William E. Trumpler
BY
Popp and Sommer
ATTORNEYS.

United States Patent Office 3,107,955
Patented Oct. 22, 1963

3,107,955
BEARING
William E. Trumpler, Olean, N.Y., assignor to Dresser Industries, Inc., Dallas, Tex., a corporation of Delaware
Filed Feb. 13, 1961, Ser. No. 88,898
10 Claims. (Cl. 308—73)

This invention relates to a bearing or bushing for operative interposition between two relatively movable members, and more particularly to a bearing for use with members between which the relative movement is intermittent or reverses direction.

Heretofore great difficulty has been presented by trying to provide a suitable bearing between two members one of which supports a heavy load exerted by the other member and between which relative movement occurs which starts and stops or reverses direction frequently. The problem is of relatively little importance where the bearing is under light load but is of considerable consequence where high loads are involved. Even under high load, the problem with which the present invention is concerned is not presented if the relative movement between the members continues in one direction. However, under high load, the frictional forces, particularly that due to static friction, between the contacting surfaces of the bearing and one of the members when relative motion between said surfaces is begun, either through intermittent movement or through reversal of the direction of movement, are so large as to result in excessive wear of the bearing with a consequent short life therefor. When the bearing burns out its replacement is required which necessitates downtime of the machine or other apparatus incorporating the bearing. It is readily apparent that this, together with the labor involved and the expense of the replacement bearing, adds considerably to the cost of equipment operation.

It is accordingly the primary object of the present invention to overcome these shortcomings by providing a bearing especially adapted for use under high load and under conditions where there is intermittent motion or reversal of motion between two relatively movable members.

This objective is accomplished by forming and maintaining an oil wedge between the opposing surfaces of the bearing and the relatively movable member whenever such relative movement begins and continues in the same direction and with the apex of the oil wedge always pointing in the direction of movement of the member relative to the bearing surface, regardless of whether the direction of movement frequently changes as in oscillatory or reciprocatory movement, or the relative movement starts and stops often as in a journal bearing for a railway freight car, especially when subjected to yard switching maneuvers.

Further objects of the present invention are to provide such a bearing which is simple in construction and hence relatively inexpensive to manufacture, but above all one which is characterized by an exceedingly long life under the aforementioned adverse operating conditions.

Still other objects and advantages of the invention will be apparent from the following detailed description of various embodiments and the accompanying drawings wherein.

Figure 1:
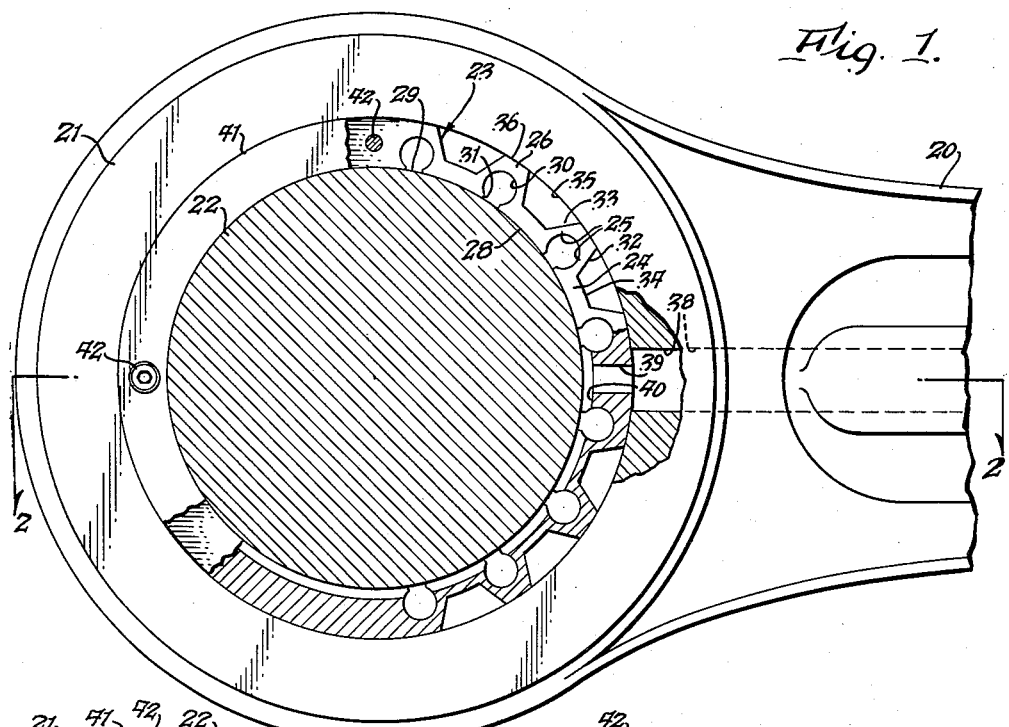
FIG. 1 is a transverse sectional view of a wrist pin for a single acting reciprocating piston crosshead and surrounded by the hub of a connecting rod, fragmentarily illustrated, and between which oscillatory members an arcuate bearing constructed according to the principles of the present invention is operatively arranged, portions of the bearing being broken away to reveal hidden structure.

FIG. 4 is a greatly enlarged fragmentary end elevational view of a portion of an arcuate bearing such as the one shown in FIG. 1 with associated relatively movable case and journal members, and illustrating the position of the concave bearing surface of a single shoe element and supporting flexible leg elements relative to the opposing surface of said journal member when there is no relative rotative movement between said members.

FIG. 4A is a diagram of the shoe and leg elements of the bearing portion shown in FIG. 4.

FIG. 5 is a view similar to FIG. 4 and illustrating the position of the shoe bearing surface relative to the opposing journal surface after rotative movement of the journal member in a counterclockwise direction relative to the case member has begun and immediately prior to sliding movement between said opposing surfaces.

FIG. 5A is a diagram of the shoe and leg elements of the bearing portion shown in FIG. 5.

FIG. 6 is a view similar to FIG. 5 and illustrating the relative positions of said surfaces after sliding movement therebetween has occurred, with the journal member rotating in a counterclockwise direction.

FIG. 6A is a diagram of the shoe and leg elements of the bearing portion shown in FIG. 6 and is similar to FIG. 5A.

FIG. 7 is a view similar to FIG. 5 but illustrating rotative movement of the journal member in a clockwise direction relative to the case member at the threshold of sliding movement between the opposing surfaces.

FIG. 7A is a diagram of the shoe and leg elements of the bearing portion shown in FIG. 7.

FIG. 8 is a view similar to FIG. 6 but illustrating the relative positions of the opposing surfaces after sliding movement therebetween has occurred, with the journal member rotating in a clockwise direction.

FIG. 8A is a diagram of the shoe and leg elements of the bearing portion shown in FIG. 8 and is similar to FIG. 7A.

Figure 9:
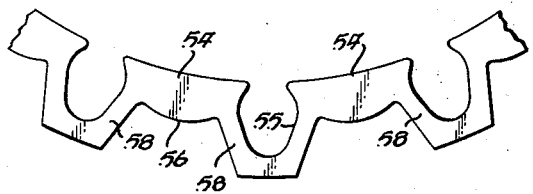

FIG. 9 is a fragmentary end elevational view of an arcuate bearing embodying the present invention and showing a modified construction thereof.

Figure 3:
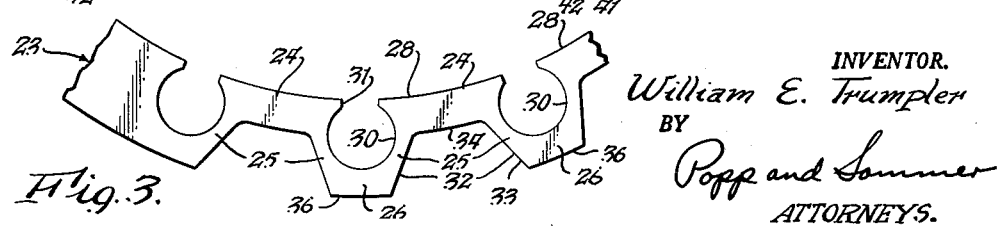
FIG. 3 is an enlarged fragmentary end elevational view of the arcuate bearing per se shown in FIG. 1.
Figure 10:
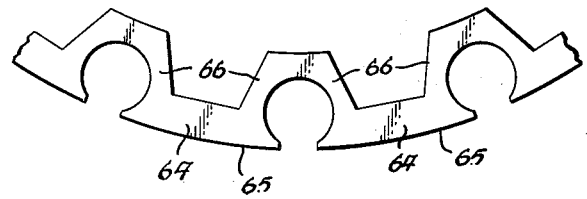

FIG. 10 is a fragmentary end elevational view of a further modified embodiment of the invention, similar to the arcuate bearing shown in FIG. 3 but with the bearing shoes formed on the exterior rather than on the interior of the bearing so that the bearing surfaces are convex.

Figure 11:
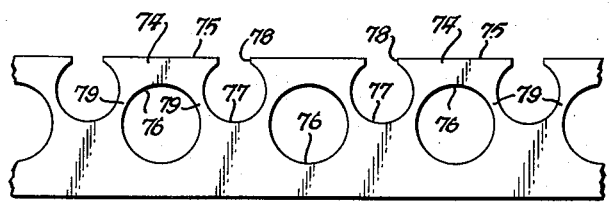

FIG. 11 is a fragmentary end elevational view of still another form of the invention and illustrating a bearing having flat bearing surfaces for supporting, typically, a reciprocable member.

As representative of a practical application for a bearing of the present invention, the same is illustrated as operatively interposed between a connecting rod 20 having an enlarged circular hub 21 at one end and a cylindrical wrist pin 22 which is surrounded by the hub. Typically, the wrist pin 22 is intended to be carried by a reciprocable cross head (not shown) in turn connected to a single-acting reciprocating piston (not shown) which always exerts its load through the wrist pin 22 against the connecting rod 20 in a direction from left to right, as viewed in FIG. 1; and vice versa, the connecting rod exerts its load on the wrist pin in a direction from right to left. The end of the connecting rod 20 not illustrated is slidably connected to an engine crankshaft (not shown). It is between the circular hub 21 and the circular wrist pin 22, that the bearing indicated generally at 23 and embodying one form of the present invention, is operatively arranged to permit of relative oscillatory movement between the hub 21 and the wrist pin 22 generally about the common axis thereof.

Referring to FIG. 3, the bearing 23 is shown as comprising a plurality of shoes 24, each of which is supported on a pair of flexible legs 25. Adjacent legs 25 at their ends remote from the bearing shoes are shown as connected by an integral web portion 26. Each of the bearing shoes 24 has a segmental concave bearing surface 28. When the bearing is unloaded or substantially so, these bearing surfaces 28 provide jointly an interrupted, at least part-cylindrical, collective bearing surface which opposes the cylindrical periphery 29 of the wrist pin 22.

In the embodiment shown in FIG. 3, the bearing may be formed by suitably machining a one-piece tubular cylindrical body of metal suitable for bearing use. For example, the shoes 24 may be formed by drilling or otherwise suitably machining cylindrical holes 30 which extend axially of the bearing and located at circumferentially spaced intervals preferably uniformly spaced. The wall portion of each hole 30 adjacent the inside of the bearing is opened radially inwardly but suitably forming a slot 31 which extends longitudinally of the hole. The wall portion of each hole 30 adjacent the outside of the bearing forms the inner curved surface of the corresponding web portion 26. The curved wall portions of each hole 30 intermediate the inside and outside of the bearing provide the laterally outer side surfaces of adjacent legs 25. The laterally inner side leg surfaces 32 which are shown as flat may be formed by milling or otherwise suitably machining in the bearing body an outwardly divergent, flat-sided channel or groove 33 having a bottom 34 which is preferably concentric with the bearing surface 28 of the corresponding shoe 24. The surface 34 may be flat or otherwise contoured as desired, and this applies also to the inner leg surfaces 32.

It is essential that the legs 25, regardless of how their inner and outer side surfaces are specifically contoured, are so dimensioned and proportioned that they are flexible, bendable or deflectable transversely of their height but yet are sturdy enough to support the load imposed upon their bearing shoe 24. Preferably the two legs 25 for a shoe 24 are symmetrical and connect to the shoe adjacent the leading and trailing ends thereof. It is further essential to the inventive bearing that the legs 25 diverge outwardly away from the corresponding shoe 24 on the side thereof opposite from the bearing surface 28.

It is evident that the legs 25 in the embodiment of the invention shown in FIG. 3 form transversely bendable, wall-like struts or beams, extending axially for the full length of the bearing, which in pairs support the bearing shoes 24. The convex peripheral surfaces 36 of the web portions 26 of the bearing 23 are severally segmental and generated about an axis corresponding generally to that for the cylindrical surface 35 of the connecting rod hub 21. The various outer segmental surfaces 36 engage the inner surface 35 of the connecting rod hub 21, and the various inner bearing surfaces 28 oppose and engage, in a manner hereinafter explained, the external cylindrical peripheral surface 29 of the wrist pin 22. The bearing 23 is arranged in the cylindrical opening 35 and suitably held to the connecting rod hub 21 so that no relative movement takes place between the opposing and contacting surfaces 35 and 36. It is intended, however, that relative movement in a circumferential direction occurs between the opposing and proximate surfaces 28 and 29.

Means are provided to lubricate the opposing surfaces 28 and 29 and to permit oil wedges to be developed therebetween, as explained later herein. For this purpose, the connecting rod 20 is shown as provided with a central longitudinal passage 38 which at one end communicates with a radial passage 39 in the body of the bearing 23. The inner end of the radial passage 39 communicates with an annular groove 40 which traverses each of the bearing shoes 24. With lubricating oil under pressure being supplied into the passage 38, it will be seen that the lubricant can flow to the opposing bearing surfaces 28 and 29. Inasmuch as the annular lubrication groove 40 crosses the slots 31, lubricant can fill the slotted holes or recesses 30. In order to prevent lubricant from flowing out the ends of these holes 30, they are closed at each end by a ring-shaped plate 41 suitably fastened, as by removable screws 42, to the end faces of the bearing body. The end rings 41 close not only the ends of the slotted holes 30 but also the ends of the channel-shaped grooves 33.

The action of the bearing 23 shown in FIGS. 1–3 can best be explained with reference to the sequence of views shown in FIGS. 4–8 and the respective diagrams shown in FIGS. 4A–8A. In these figures only a portion of the bearing including one shoe 24 with its supporting legs 25 is shown since this is representative of all similar such portions.

When there is no relative movement in a circumferential direction between the connecting rod hub 21 and the wrist pin 22, as represented in FIG. 4, the effective axis 43 of each leg 25 is an imaginary line drawn parallel to the flat inner leg surface 32 and halfway through the thinnest portion of the leg. Projecting the axes 43 for the legs 25, it will be seen that they intersect at point 44 which is eccentric to the central axis of the wrist pin 22.

Referring to the corresponding diagram of FIG. 4A, the bearing shoe 24 is represented by the upper horizontal straight solid line 24a, the outer or case member 21 by the lower horizontal straight solid line 21a, the left and right legs 25 by the straight solid lines 25L and 25R, respectively, which incline upward and toward each other along axes 43a which intersect at 44a. The solid lines 21a, 25L, 24a and 25R thus form a trapezoid.

FIG. 5 represents the condition of these various elements after the wrist pin or journal member 22 has moved in a counterclockwise direction relative to the hub or case member 21 and immediately prior to sliding movement occurring between the opposing surfaces 28 and 29. The static friction between the contacting and loaded surfaces 28 and 29 initially causes the bearing shoe 24 to follow the journal member 22 when the latter starts to revolve, without slipping or sliding between these surfaces. With reference to the direction of movement of the wrist pin 22, as represented by the arrow 45 in FIG. 5, the bearing shoe 24 is translated or tilted so that the right or leading end 24L is in contact with the wrist pin surface 29 but the left or trailing end 24T of the bearing shoe 24 is spaced from the opposing surface 29. This produces a wedge-shaped space 47 between the opposing surfaces 28 and 29, filled with lubricating oil.

Referring to the corresponding diagram of FIG. 5A, it will be seen that the elements 15L, 24a and 25R have moved from their respective positions represented by dotted lines to the respective positions represented by the solid lines 25L', 24a' and 25R'. The left leg 25L might be considered to pivot about the point 46 and the right leg about the point 48. This means that the right or leading end 24L of the bearing shoe moves upwardly and to the right while the left or trailing end 24T also moves to the right but downwardly. Tilting of the shoe 24 in the manner described is due to the initial inclined disposition of the legs 25. In effect, the bearing shoe 24 (24a) has been subject to a translational movement which is generally pivotal about the axis 44 (44a) which axis, it will be noted, is arranged on that side of this bearing shoe which faces its bearing surface 28.

FIG. 6 represents the condition of the elements after sliding movement between the opposing surfaces 28 and 29 has occurred, and FIG. 6A represents a diagram thereof. It will be noted that FIGS. 6 and 6A are substantially the same as FIGS. 5 and 5A except that the right or leading end 24L of the bearing shoe 24 is no longer contacting the wrist pin surface 29, but is slightly spaced therefrom, as indicated at 49, such space being now occupied by a film of oil. As well, the generally wedge-shaped space 47 between the opposing surfaces 28 and 29 is filled with oil, as previously noted.

The oil wedge in the spaces 47, 49 lubricates the opposing surfaces 28 and 29 over their entire opposing areas and while the space 47 for the oil wedge was produced initially by the frictional drag forces between the surfaces 28 and 29, the oil wedge is maintained by the hydraulic pumping effect produced by the rotating journal member 22 constantly forcing oil into the spaces 47 and 49 wherein the oil is under pressure to keep the surfaces 28 and 29 separated slightly. In other words, as the wrist pin rotates, oil adhering to its periphery is forcefully driven into the wedge-shaped space between the opposing surfaces 28 and 29. As long as the journal member 22 continues to rotate in the same direction, it will be observed that oil is forced into the wedge-shaped space 47, 49 even though the volume of this space may vary with the speed of rotation.

When movement of the journal member 22 in the direction of the arrow 45 shown in FIGS. 5 and 6 ceases so that there is no relative movement between the members 21 and 22, full contact between the opposing surfaces 28 and 29 will be re-established as shown in FIGS. 4 and 4A.

Assume now that the wrist pin or journal member 22 begins to rotate in a clockwise direction as represented by the arrow 50 in FIG. 7. The frictional engagement between the opposing surfaces 28 and 29 will cause the bearing shoe 24 to shift to the left and to bend the legs 25 supporting this shoe to the left so that the left end of the shoe 24 now becomes the leading end 24L and the right end of this shoe becomes the trailing end 24T. Referring to the diagram of FIG. 7A, the dotted line trapezoid 21a, 25L, 24a and 25R has been displaced to the configuration represented by the solid lines 21a, 25L″, 24a″ and 25R″.

Again, the bearing shoe 24 is allowed to tilt generally about the axis 44 (44a) whenever there is relative movement between the members 21 and 22 to urge the leading end 24L of the bearing shoe 24 toward the surface 29 on the member 21 and to urge the trailing end 24T of the shoe away from this surface 29, whereby a wedge-shaped clearance 51 is established between the surfaces 28 and 29 and having an apex always pointing in the direction of relative movement.

In this manner when actual sliding motion begins to take place between the opposing surfaces 28 and 29 as represented in FIGS. 8 and 8A, there is always a film of oil immediately established and maintained as long as the journal member continues to rotate in the same direction. In FIG. 8, oil fills the proximate space indicated at 52 between the opposing surfaces 28 and 29. This contributes to the longevity of the bearing, even under conditions of high load and with frequent starting and stopping or oscillatory movement between these surfaces.

It will be appreciated that FIGS. 4–8 and 4A–8A are schematic and greatly exaggerate clearances and movement in order to make the explanation of what takes place clear.

In the illustrated embodiment of FIG. 1, it is assumed that the load between the wrist pin 22 and the connecting rod 20 is always transmitted on the right-hand side of the wrist pin as viewed in this figure. Accordingly, the left half of the bearing or bushing 23 is shown as solid and unprovided with the shoes 24 and supporting legs 25 although it may be so provided, if desired. However, if the piston with which the wrist pin 22 is associated were of the double-acting type so that both sides or halves of the wrist pin 22 would transmit loads to the corresponding halves of the connecting rod hub 21, then the shoes 24 would preferably be provided about the full circumference of the bearing or bushing 23.

Figure 2:
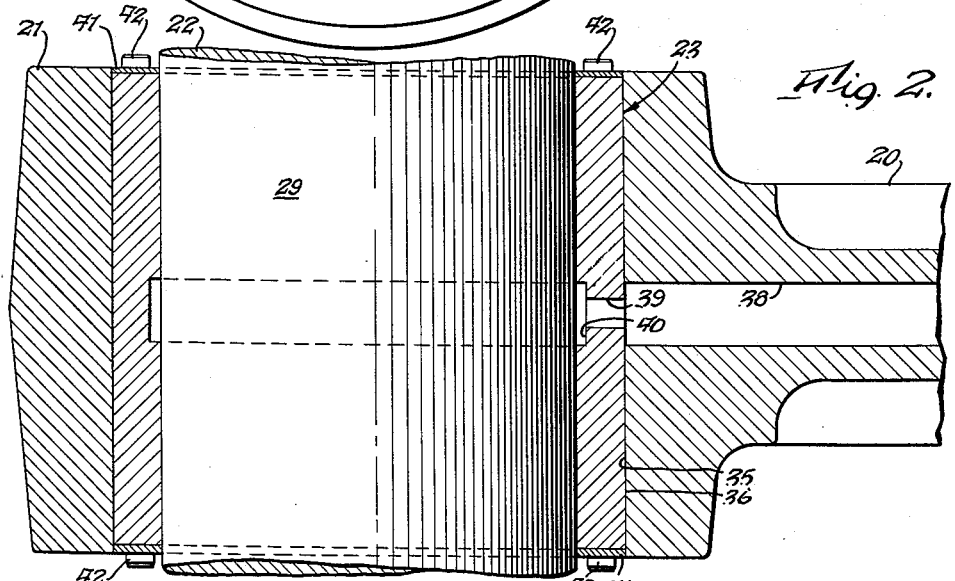
FIG. 2 is a sectional view thereof taken longitudinally of the wrist pin and generally along line 2—2, FIG. 1.

A bearing constructed as the one 23 illustrated in FIGS. 1–3 has a unit loading of 3200 pounds per square inch. This compares most favorably with the maximum loading on a conventional grooved bushing which is about 1300 pounds per square inch.

FIG. 9 shows a modified form of arcuate bearing constructed according to the present invention. The bearing comprises a plurality of shoes 54 separated by non-circular grooves 55. The undersurface of the shoes 54 bulges outwardly as indicated at 56. The arcuate bearing of FIG. 9 may be used if ultimate loading is required and the cross sectional shape can readily be broached to provide the additional strength without sacrificing the flexibility of the legs 58, 58.

The still further modified form of the invention shown in FIG. 10 follows the construction of bearing disclosed in FIG. 3 except that the bearing shoe 64 is now arranged on the outside of the bearing rather than on the inside as in the case of FIG. 3. Thus, the bearing surface 65 of each shoe 64 is convex. Each of the shoes 64 is still supported on a pair of inclined flexible legs 66.

The construction of bearing shown in FIG. 11 is illustrative of one that may be employed in a strip bearing in which the various shoes 74 are provided with flat bearing surfaces 75. The shoes 74 are formed by a series of parallel and spaced holes 76 extending under each bearing surface and a series of alternately arranged smaller holes 77 arranged at a higher elevation intermediate adjacent pairs of holes 76. The side of the holes 77 closest to the bearing surfaces 75 are opened by slots 78. The legs 79 thus provided are of the requisite flexibility to permit the tilting of the pads 74 as the member supported thereby (not illustrated in FIG. 11) moves or slides over the bearing surfaces 75.

In the several embodiments of the inventive bearing construction illustrated, it is evident that the various forms of bearing shoes, such as the shoe 24 shown in FIGS. 1–8 or the shoe 54 of FIG. 9 or the shoe 64 of FIG. 10 or the shoe 74 of FIG. 11, are each a translationally movable inflexible bridge-like element supported adjacent its ends on flexible legs so formed and oriented as to allow such bridge-like element to be tilted when tending to be frictionally dragged so that the leading end of the frictionally dragged bridge-like element is lifted and the trailing end lowered thereby immediately forming a wedge-shaped clearance into which oil is pumped when relative movement between the sliding surfaces begins.

While the inventive bearing has been described as being particularly advantageous for use with members between which the relative movement is intermittent or reverses direction, it is to be understood that the inventive bearing also has useful application for interposition between members which have continuous relative movement in one direction such as in continuous rotation. Should friction increase between the relatively moving surfaces, one of which is the bearing surface of the tiltable shoe of the inventive bearing, due to any cause such as dirt in the oil, it will be seen that this increased friction will tilt the bearing shoe more thereby opening the wedge shaped space to allow more oil to fill the same. Thus the positional compensation of the bearing shoe that the increased friction provides makes it possible for the bearing to adjust to the new condition, perhaps to correct this condition by allowing the fouled oil to be purged, and generally to wear itself in and prevent failure, even in a bearing for a situation of continuous rotation.

From the foregoing, it will be seen that the present invention provides a simple bearing which is characterized by always providing an oil wedge between the surface of the bearing and the opposing surface of the member which moves relative thereto and which oil wedge has an apex which points always in the direction of movement of such member relative to the bearing surface. A bearing may be constructed in accordance with the principles of the present invention for application as a journal bearing, a thrust bearing, a strip bearing, or otherwise. Various modifications may suggest themselves to those skilled in the art. For example, the flexible leg members and the bearing shoes supported thereby may be formed integrally on one of the members which has relative movement with respect to the other which is formed with a continuous bearing surface to operatively oppose the bearing surface of the shoes. Accordingly, the various embodiments of the present invention described herein are illustrative and not limitative of the present invention which is to be measured in scope by the appended claims.

What is claimed is:

1. In apparatus having two relatively movable members, the combination therewith of bearing means operatively interposed between said members, said bearing means comprising:
   (a) an inflexible bridge-like element,
   (b) a bearing surface carried by said element and opposing a surface on one of said members which is slidable relative to said bearing surface, said bearing surface having leading and trailing ends determined with reference to the direction of sliding of said surface on said one member relative to said bearing surface,
   (c) and means adjacent the ends of said element and supporting said element on the other of said members and arranged to allow said element to tilt to urge said leading end toward said surface on said one member and to urge said trailing end away from this last mentioned surface whenever there is a tendency toward relative sliding between said surfaces due to relative movement between said members, whereby a wedge-shaped clearance is established between said surfaces and having an apex always pointing in said direction.

2. In apparatus having two relatively movable members, the combination therewith of bearing means of the oil wedge type operatively interposed between said members, said bearing means comprising:
   (a) an inflexible bridge-like element,
   (b) a bearing surface carried by said element and opposing a surface on one of said members which is slidable relative to said bearing surface, said bearing surface having leading and trailing ends determined with reference to the direction of sliding of said surface on said one member relative to said bearing surface,
   (c) and means adjacent the ends of said element and supporting said element on the other of said members and arranged to allow said element to tilt to urge said leading end toward said surface on said one member and to urge said trailing end away from this last mentioned surface whenever there is a tendency toward relative sliding between said surfaces due to relative movement between said members, whereby with lubricating oil present a wedge of oil is established between said surfaces and having an apex always pointing in said direction.

3. In apparatus having two relatively movable members, the combination therewith of bearing means operatively interposed between said members, said bearing means comprising:
   (a) an inflexible bridge-like element,
   (b) a bearing surface carried by said element and opposing one of said members which is adapted to move relative to said surface,
   (c) and plural flexible leg means adjacent the ends of said element for supporting said element on the other of said members and effectively inclined with respect to said surface so as to extend divergently therefrom toward said other member,
   (d) each of said leg means effectively extending other than normal to said surface.

4. In a bearing, the combination comprising:
   (a) a movable inflexible bridge-like element,
   (b) a bearing surface carried by said element,
   (c) and means adjacent the ends of said element and supporting said element for translational movement which is generally pivotal about an axis arranged on that side of said element which faces said surface.

5. In a bearing, the combination comprising:
   (a) a movable inflexible bridge-like element,
   (b) a bearing surface carried by said element,
   (c) and means adjacent the ends of said element and supporting said element for translational movement which is generally pivotal about an axis arranged on that side of said element which faces said surface,
       (1) said means including a pair of legs arranged on the side of said element opposite from said surface and which effectively diverge in a direction away from said element.

6. In an arcuate bearing, the combination comprising:
   (a) a movable inflexible bridge-like element,
   (b) a part-cylindrical bearing surface carried by said element,
   (c) and means adjacent the ends of said element and supporting said element for translational movement which is generally pivotal about an axis parallel to that for said surface and which axis is arranged on that side of said element which faces said surface.

7. In a bearing, the combination comprising:
   (a) a plurality of spaced and movable inflexible bridge-like elements,
   (b) a bearing surface on one side of said element and substantially coextensive in area therewith,
   (c) and means adjacent the ends of each of said elements and supporting the corresponding one of said elements for translational movement which is generally pivotal about an axis arranged on that side of such element which faces its said bearing surface.

8. In an arcuate bearing, the combination comprising:
   (a) a plurality of circumferentially spaced and movable inflexible bridge-like elements,
   (b) a curved bearing surface carried by each of said elements, said surfaces jointly defining an interrupted and at least part-cylindrical collective surface when the bearing is substantially unloaded,
   (c) and means adjacent the ends of each of said elements and supporting the corresponding one of said elements for translational movement which is generally pivotal about an axis arranged on that side of such element which faces its said bearing surface, said axis also being eccentric to said collective surface.

9. In apparatus having two relatively movable members, the combination therewith of bearing means operatively interposed between said members, said bearing means comprising:
   (a) an inflexible bridge-like element,
   (b) a bearing surface carried by said element and opposing a surface on one of said members,
   (c) and means adjacent the ends of said element and supporting said element on the other of said members and arranged to allow said element to tilt when the friction between said surfaces causes a drag on said element to lift the leading end of said bearing surface toward the other of said surfaces and to lower the trailing end of said bearing surface away from said other surface, whereby a wedge-shaped clearance is established between said surfaces and having an apex always pointing in the direction in which said element is frictionally dragged.

10. In apparatus having two relatively movable members, the combination therewith of bearing means operatively interposed between said members, said bearing means comprising:
    (a) an inflexible bridge-like element,
    (b) a bearing surface on one side of said element and substantially coextensive in area therewith and opposing a surface on one of said members,
    (c) and means adjacent the ends of said element and supporting said element on the other of said members and arranged to allow said element to tilt when the friction between said surfaces causes a drag on said element to lift the leading end of said bearing surface toward the other of said surfaces and to lower the trailing end of said bearing surface away from said other surface, whereby a wedge-shaped clearance is established between said surfaces and having an apex always pointing in the direction in which said element is frictionally dragged.

References Cited in the file of this patent

UNITED STATES PATENTS

| | | |
|---|---|---|
| 1,593,251 | Flintermann | July 20, 1926 |
| 2,167,882 | Fast | Aug. 1, 1939 |
| 2,217,200 | Fast | Oct. 8, 1940 |
| 2,424,028 | Haeberlein | July 15, 1947 |
| 2,823,963 | Balsiger | Feb. 18, 1958 |

FOREIGN PATENTS

| | | |
|---|---|---|
| 715,553 | Great Britain | Sept. 15, 1954 |